US011758620B2

(12) United States Patent
Henne et al.

(10) Patent No.: US 11,758,620 B2
(45) Date of Patent: Sep. 12, 2023

(54) ARRANGEMENT FOR SWITCHING A RESISTOR

(71) Applicant: Webasto SE, Stockdorf (DE)

(72) Inventors: Alexander Henne, Stockdorf (DE); Norbert Botzenmayer, Stockdorf (DE); Hans Rechberger, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 792 days.

(21) Appl. No.: 16/627,082

(22) PCT Filed: Jun. 22, 2018

(86) PCT No.: PCT/EP2018/066703
§ 371 (c)(1),
(2) Date: Dec. 27, 2019

(87) PCT Pub. No.: WO2019/002112
PCT Pub. Date: Jan. 3, 2019

(65) Prior Publication Data
US 2020/0146110 A1 May 7, 2020

(30) Foreign Application Priority Data
Jun. 30, 2017 (DE) .................. 10 2017 114 714.4

(51) Int. Cl.
*H05B 1/02* (2006.01)
*H01H 33/59* (2006.01)
*H02M 3/06* (2006.01)

(52) U.S. Cl.
CPC ............. *H05B 1/02* (2013.01); *H01H 33/596* (2013.01); *H02M 3/06* (2013.01); *H05B 2203/013* (2013.01)

(58) Field of Classification Search
CPC .. H05B 1/0244; H05B 2203/023; H05B 3/78; H05B 1/0236; H05B 2203/003;
(Continued)

(56) References Cited

U.S. PATENT DOCUMENTS 3,780,263 A * 12/1973 Kuzyk ................. G03D 13/006
219/505
4,259,937 A * 4/1981 Elliott .................... F02M 31/16
123/549
(Continued)

FOREIGN PATENT DOCUMENTS

CN 101520471 A 9/2009
CN 201335857 Y 10/2009
(Continued)

OTHER PUBLICATIONS

The State Intellectual Property Office of People's Republic of China, First Office Action, Application No. 201880044228.7, dated Jul. 2, 2021, 13 pages.
(Continued)

Primary Examiner — Chris Q Liu
(74) Attorney, Agent, or Firm — Quarles & Brady LLP

(57) ABSTRACT

An arrangement, comprising a heat-emitting resistor, a control device for switching the resistor and a component that is at a potential without direct reference to a drive voltage. The resistor is arranged in spatial proximity to the component, and has a first and a second partial resistor connected in series. The control device includes at least one switching device for switching the heat-emitting resistor. The first partial resistor, the switching device and the second partial resistor are connected in series in the stated order and form a series connection. The first partial resistor and the component form a first partial capacitance and the second resistor and the component form a second partial capacitance. The partial capacitances are formed in such a way that upon the switching of the resistor a current flowing in the first partial capacitance is at least partly taken up by the second partial capacitance, or vice versa.

16 Claims, 2 Drawing Sheets

(58) Field of Classification Search
CPC ........ H05B 2203/013; H05B 2203/017; H05B 2203/021; H05B 3/00; H05B 3/26; H05B 3/46
USPC ................ 219/210, 241, 494, 499, 501, 505
See application file for complete search history.

(56) References Cited

U.S. PATENT DOCUMENTS

| | | | | |
|---|---|---|---|---|
| 4,968,901 | A * | 11/1990 | Shacter | G01R 15/08 333/81 R |
| 5,105,067 | A * | 4/1992 | Brekkestran | G05D 23/1934 219/486 |
| 8,965,187 | B2 * | 2/2015 | Borgmeier | H05B 3/46 219/535 |
| 2008/0159692 | A1 * | 7/2008 | Yao | G02B 6/276 385/28 |
| 2008/0219382 | A1 * | 9/2008 | Ahn | H04L 25/0292 375/316 |
| 2010/0038351 | A1 * | 2/2010 | Tabaczynski | B60L 1/08 219/217 |
| 2012/0008927 | A1 | 1/2012 | Borgmeier | |
| 2015/0260429 | A1 * | 9/2015 | Herbert | F24H 9/2014 392/498 |

FOREIGN PATENT DOCUMENTS

| | | |
|---|---|---|
| DE | 102010028533 A1 | 11/2011 |
| GB | 2168495 A | 6/1986 |
| GB | 2233180 B | 10/1993 |
| WO | 2013030048 A1 | 3/2013 |
| WO | 2013107714 A1 | 7/2013 |
| WO | 2013186106 A1 | 12/2013 |

OTHER PUBLICATIONS

International Searching Authority. International Search Report and Written Opinion for application PCT/EP2018/066703, dated Sep. 4, 2018.

* cited by examiner

ARRANGEMENT FOR SWITCHING A RESISTOR

CROSS-REFERENCE TO RELATED APPLICATIONS

This application represents the national stage entry of PCT International Patent Application No. PCT/EP2018/066703 filed on Jun. 22, 2018 and claims priority to German Patent Application No. DE 10 2017 114 714.4 filed Jun. 30, 2017. The contents of each of these applications are hereby incorporated by reference as if set forth in their entirety herein.

DESCRIPTION

The disclosure relates to an arrangement, comprising a heat-emitting resistor, a control device for switching the resistor and an (in particular earthed or at an earthlike reference potential) component that is at a potential without direct reference to a drive voltage, in particular a housing and/or a chassis component, wherein the resistor is arranged in spatial proximity to the component, in particular housing or chassis component, according to claim 1 and to a corresponding control method according to claim 10.

Figure 1:
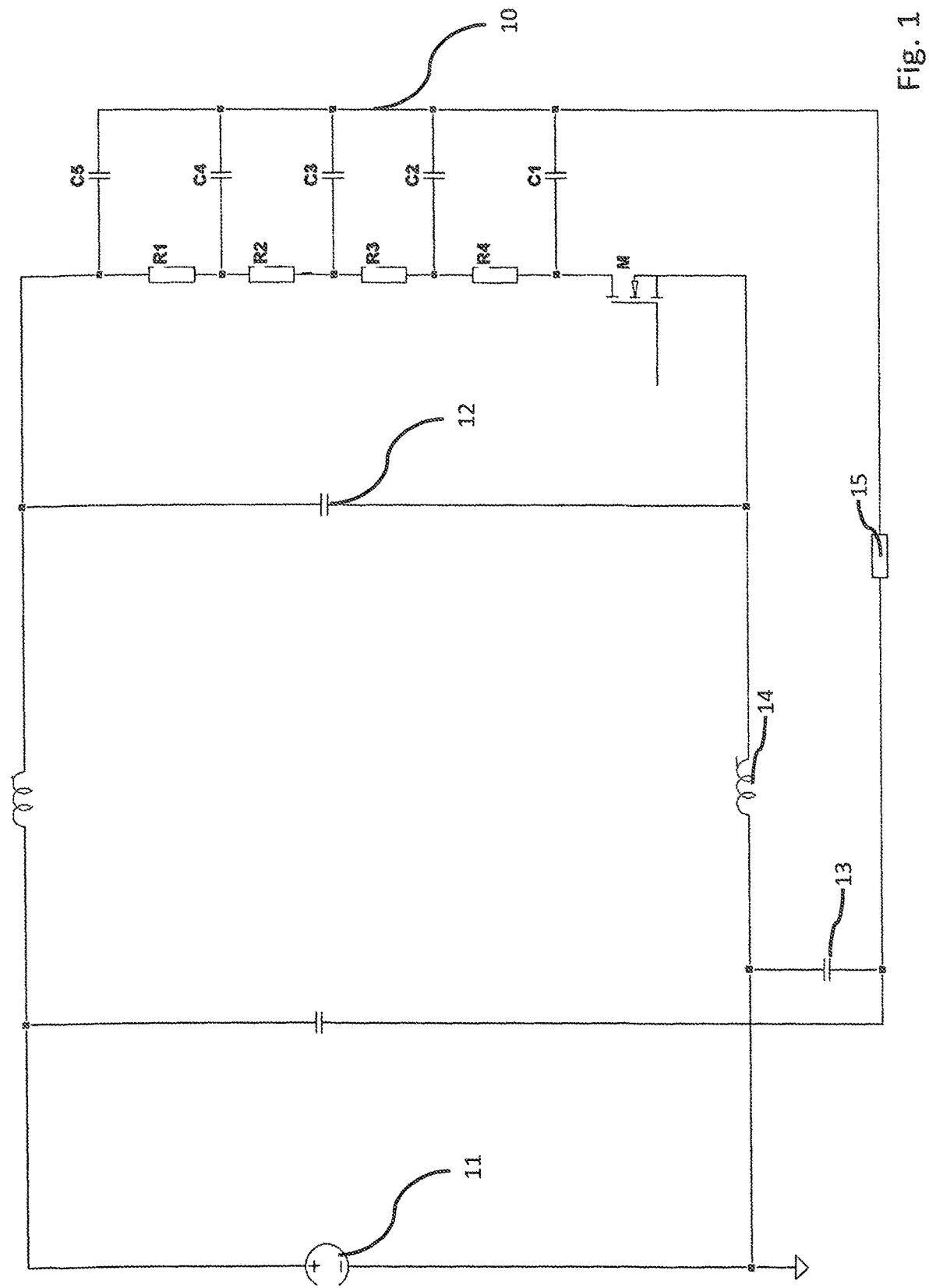

FIG. 1 illustrates the prior art and shows a resistor which is situated in proximity to a housing and is illustrated symbolically by the resistors R1 to R4. The resistor is cooled for the purpose of heat dissipation to the housing.

The capacitors C1 to C5 correspond to a symbolic illustration of a capacitance which is assigned to the resistor and arises as a result of the spatially close linking of the resistor to the housing.

The transistor M switches the resistor (R1 to R4) on and off. If the transistor M is switched off, the complete resistor (R1 to R4) is at the supply voltage. If the transistor M is then switched on, the voltage across the resistor (R1 to R4) changes. A lower end (in FIG. 1) of R4 tends towards 0 V, while an upper end (in FIG. 1) of R1 is still at the supply voltage. The central voltage, that is to say one between a lower end (in FIG. 1) of R2 and an upper end (in FIG. 1) of R3 of the complete resistor (R1 to R4), corresponds to half the supply voltage.

This has the consequence that the capacitance (C1 to C5) in this schematic example is wholly or at least partly discharged. C1 is "fully" discharged, for example, while C3 is discharged to half the supply voltage. On average this has the consequence that the entire capacitance is discharged by half the supply voltage.

If the transistor M is switched off, this phenomenon is repeated in principle. The capacitances are not discharged in this case, but rather charged (up to the supply voltage).

The described charging and discharging of the capacitors can lead to significant electromagnetic interference (both conducted and emitted interference) depending on speed.

Particularly if the resistor (R1 to R4) is switched rapidly (and has a distributed capacitance to earth), interference can occur on a housing and/or a cable screen and/or earthing lines. Customary countermeasures are:
 a screen in order that the resistor no longer couples to earth potential,
 filter components (common-mode inductors, Y-capacitors),
 slowing down the clocking (switching frequency, switching time).

However, a screen is not possible in all cases or is often integratable only with significant additional costs. A screen ensures moreover that a possible thermal link deteriorates since both a screening layer and at least one further insulation layer are required.

Depending on the application (with regard to voltage and current), filter components can be comparatively expensive, heavy and voluminous.

Slowing down the clocking (switching time) is often undesirable since the clocking is correspondingly adapted to other requirements.

It is therefore an object of the present disclosure to propose an arrangement comprising a heat-emitting resistor, a control device for switching the resistor and an (in particular earthed) component that is at a potential without direct reference to a drive voltage, in particular a housing and/or chassis component, wherein the first resistor is arranged in spatial proximity to the component, in particular housing or chassis component, wherein interference on account of the switching of the resistor is intended to be reduced in a simple manner. Furthermore, it is an object of the disclosure to propose a corresponding control method.

This object is achieved by means of the features of Claim 1.

In particular, the object is achieved by means of an arrangement, comprising a heat-emitting resistor, a control device for switching the resistor and an, in particular earthed, component that is at a potential without (direct) reference to a drive voltage, in particular a housing or chassis component, wherein the first resistor is arranged in spatial proximity to the component, in particular housing, and has a first and a second partial resistor connected in series with one another, wherein the control device comprises at least one switching device, wherein the first partial resistor, the switching device and the second partial resistor are connected in series in the stated order and thus form a series connection. Preferably, the first partial resistor and the component form a first partial capacitance and the second resistor and the component form a second partial capacitance, wherein the partial capacitances are formed in particular in such a way that upon the switching of the resistor a current flowing in the first partial capacitance is at least partly taken up by the second partial capacitance, or vice versa.

In accordance with a central concept of the disclosure, the switching device is arranged between the first partial resistor and the second partial resistor. As a result, (when the switching device is switched on) a voltage can be divided (in particular uniformly) across the resistors, which can lead to a current flow in the (parasitic) capacitances (or partial capacitances). In this case, a current that flows in the first partial capacitance can be taken up (directly) by the second partial capacitance (or vice versa, i.e. the current that flows in the second partial capacitance can be taken up by the first partial capacitance). As a result, less (or no) current flows via an earth link. As a result, interference on account of the switching of the resistor is reduced in a simple manner.

Switching the resistor should be understood to mean, in particular, switching on and/or switching off the resistor. Switching on the resistor can involve, if appropriate, a process of switching on the resistor (initially) in which said resistor is started up initially (after a relatively long pause of, for example, at least 10 seconds or at least one minute). Switching off the resistor can accordingly be understood, in particular, as a final (at least for the duration of at least 10 seconds or at least one minute) shutdown of the resistor (or as disconnection of the resistor from the current source). However, switching (switching on and/or off) can also involve switching processes that are predefined by the control of the switching device itself (e.g. PWM control). Here the switching device then preferably changes between a switched-on state (in which said switching device allows current to pass) and a switched-off state (in which a current is blocked). The frequency for switching processes or switching-on processes of the switching device can be, in particular, at least 1 kHz, preferably at least 8 kHz. In this sense the resistor can be regarded as switched on if the switching device allows a current to pass, and as switched off if the switching device blocks such a current. The current flow through the resistor then depends in turn on further components, such that the current flow in the switched-off state of the switching device need not necessarily be zero, but can indeed become (usually) zero.

In the case, too, of oscillating driving (in particular PWM driving) possibly present, (extremely) short interruptions (separated e.g. by the individual pulses) in the current supply can occur. During these (very short) interruptions, however, the resistor (in particular heating resistor) can still be in the switched-on state in the sense that the heating effect of the resistor is intended to continue to be present (that is to say that said resistor is not finally switched off). In relation to the switching devices, it is possible to distinguish between a switched-on time duration (that is to say a time duration in which the switching device does not block current) and a switched-off time duration (that is to say a time duration in which the switching device blocks the current). When reference is made to the point in time of the start-up of the resistor in the case of the switching device, this is intended to be referred to, in particular, as "initial" switching on of the switching device. Here, too, initial switching on is intended to be understood, in particular, as switching on after an interruption of at least 10 seconds or at least one minute. In just the same way, final switching off is intended to mean that the switching device does not allow any current to pass or is switched off for at least 10 seconds, preferably at least one minute.

A "spatial proximity" between the heat-emitting resistor and the component (e.g. housing) is intended to be understood as, in particular, a (minimum) distance of less than 1 cm, in particular less than 0.5 cm, between resistor and component. The "minimum distance" is the smallest distance if a distance between resistor and component is not constant (spatially, i.e. along an extent of an interspace). Resistor and component are intended to be spaced apart from one another, however, to the extent that no short circuit is formed between resistor and housing. The (first) resistor is preferably the resistor of an electrical heating apparatus, in particular electrical layer heating apparatus. Electrical layer heating apparatuses comprise a heating resistor that extends in a planar fashion and is heated as an electric current is conducted through it. Generally, the resistor is a resistor arranged for the purpose of heat dissipation in spatial proximity to an (in particular earthed) component that is preferably at a potential without direct reference to a drive voltage, in particular to a housing and/or a chassis component. The resistor can generally be a heating resistor, that is to say that component via which heat is generated for heating purposes in a heating apparatus, or some other resistor, which possibly has to be cooled.

Preferably, the first partial capacitance corresponds to at least 30%, more preferably at least 40%, and/or at most 70%, preferably at most 60%, of the second partial capacitance. In one embodiment, the first partial capacitance can (at least substantially) correspond to the second partial capacitance. In this context, "correspond" should be understood to mean, in particular, the respective capacitance value (in farads) (to be compared with one another). Given (approximately) identical capacitance, the voltage can be divided uniformly across the partial resistors, which can lead to a current flow in the respective (parasitic) capacitances. In the ideal case, current then no longer flows via an earth link.

In the embodiment, the first partial resistor can correspond to at least 30%, preferably at least 40%, and/or at most 70%, preferably at most 60%, of the second partial resistor. In particular, the first partial resistor can (at least substantially) correspond to the second partial resistor. Here, "correspond" should be understood to mean a comparison of the resistance values (in ohms). If the first partial resistor thus corresponds for example to 30% of the second partial resistor, this thus means e.g. that the first partial resistor has a value of 300 ohms and the second partial resistor has a value of 1000 ohms.

The switching device can comprise a transistor, in particular MOSFET or IGBT, preferably based on silicon and/or silicon carbide and/or gallium arsenide.

The heat-emitting resistor can be a heating layer resistor.

Furthermore, provision can be made of a backup apparatus, in particular comprising one or more capacitances, for example in parallel with the heat-emitting resistor and/or the switching device.

The control device can be configured for the pulse-width-modulated driving of the heat-emitting resistor.

Furthermore, a voltage supply, in particular a DC voltage source (DC voltage supply), can be provided. However, such a voltage source (voltage supply) can optionally also be provided externally, with the result that the arrangement merely has corresponding terminals for connecting a voltage source (voltage supply).

The control device is preferably configured for switching the resistor with a frequency of at least 1 kHz, preferably at least 8 kHz, and/or at most 250 kHz, more preferably at most 180 kHz. The switching frequency here is intended to be, in particular, that frequency which is defined by switching-on processes of the switching device. By way of example, if 1000 switching-on processes per second are carried out (with correspondingly 1000 switching-off processes), a switching frequency of, in particular, 1 kHz is intended to be present.

In so far as PWM driving (pulse-width-modulated driving) is realized, a frequency (clock rate) of the PWM driving is preferably in a range of 1 kHz to 250 kHz, more preferably of 8 kHz to 180 kHz. A pulse width (duty factor) of the PWM driving can preferably be in the range of 1% to 100% of a clock cycle.

The object mentioned above is furthermore achieved by means of a control method, in particular using the above arrangement, for switching a heat-emitting resistor having a first and a second partial resistor, said heat-emitting resistor being arranged in spatial proximity to an (in particular earthed) component that is at a potential without (direct) reference to a drive voltage, in particular a housing or chassis component, wherein the first partial resistor and the component form a first partial capacitance and the second resistor and the component form a second partial capacitance, wherein upon the switching of the resistor a current flowing in the first partial capacitance is at least partly taken up by the second partial capacitance, or vice versa.

Preferably, the heat-emitting resistor is driven in a pulse-width-modulated manner and/or is switched with a frequency of at least 1 kHz, preferably at least 8 kHz and/or at most 250 kHz, preferably at most 180 kHz. Further method steps are evident from the explanation of the arrangement (in particular the functional features thereof).

The object mentioned above is furthermore achieved by means of an electrical heating apparatus, in particular layer heating apparatus, comprising an arrangement of the type described above and/or configured for carrying out the control method described above. With regard to the advantages of the electrical heating apparatus and of the control method, reference is made to the explanations concerning the arrangement described above. The electrical heating apparatus can also comprise a (clocked) wire heater or a PTC element as heating element.

The electrical layer heating facility can comprise a heating layer, which forms an electrical resistor and is heated by a current flowing through the heating layer, with the result that heat for heating purposes can be emitted.

The heating layer (heating coating) can be applied for example in a plasma coating method, in particular plasma spraying, or in a screen printing method or as resistive paste, in particular on the insulating layer. In the plasma coating method, by way of example, firstly an electrically conductive layer can be applied, in particular on the insulating layer. Regions can subsequently be cut out from the electrically conductive layer, one conductor track or a plurality of conductor tracks thus remaining. A masking technique is preferably used, however. The conductor tracks can then form the heating resistor or a plurality of heating resistors. As an alternative to a masking technique, the regions mentioned can be cut out from the conductive layer by means of a laser, for example. The heating coating can for example be a metal layer and optionally contain nickel and/or chromium or consist of these materials. By way of example, 70-90% nickel and 10-30% chromium can be used, wherein a ratio of 80% nickel and 20% chromium is regarded as well suited.

The heating coating can occupy for example an area of at least 5 cm$^2$, preferably at least 10 cm$^2$, and/or at most 500 cm$^2$, preferably at most 200 cm$^2$.

The heating coating preferably has a height (thickness) of at least 5 µm, preferably at least 10 µm and/or at most 1 mm, preferably at most 500 µm, even more preferably at most 30 µm, even more preferably at most 20 µm. A conductor track defined by the heating coating can have a width of at least 1 mm, preferably at least 3 mm, even more preferably at least 5 mm, even more preferably at least 10 mm, even more preferably at least 30 mm. "Width" should be understood to mean the extent of the conductor track perpendicular to the longitudinal extent thereof (which usually also defines the direction of the current flow).

The arrangement according to the disclosure (and in particular a heating coating optionally provided) can be designed for operation in the low-voltage range, preferably for 12 volts, 24 volts or 48 volts. "Low-voltage range" should preferably be understood to mean an operating voltage of less than 100 volts, in particular less than 60 volts (DC voltage). Preferably, the arrangement according to the disclosure (and in particular a heating coating optionally provided) is designed for operation in the high-voltage range, preferably for above 100 V or above 250 V or above 500 V, e.g. in a range of 250-800 V. The above-explained effects to be avoided in the case of the prior art are particularly pronounced in a higher voltage range. In general, the arrangement, and in particular a heating coating optionally provided, is designed for operation with DC current.

The layer heating facility or heating coating can be embodied in principle as described in WO 2013/186106 A1 and/or WO 2013/030048 A1. Heating facilities are described therein which have an electrical heating layer that heats up when an electrical voltage is applied (or a current flows).

The resistors already mentioned can be produced from an arbitrary electrically conductive material, in principle, but are preferably composed of metal.

The arrangement according to the disclosure and/or the method according to the disclosure and in particular the electrical heating apparatus are preferably provided and/or correspondingly configured for use in a vehicle, in particular motor vehicle.

Further embodiments are evident from the dependent claims.

Figure 2:
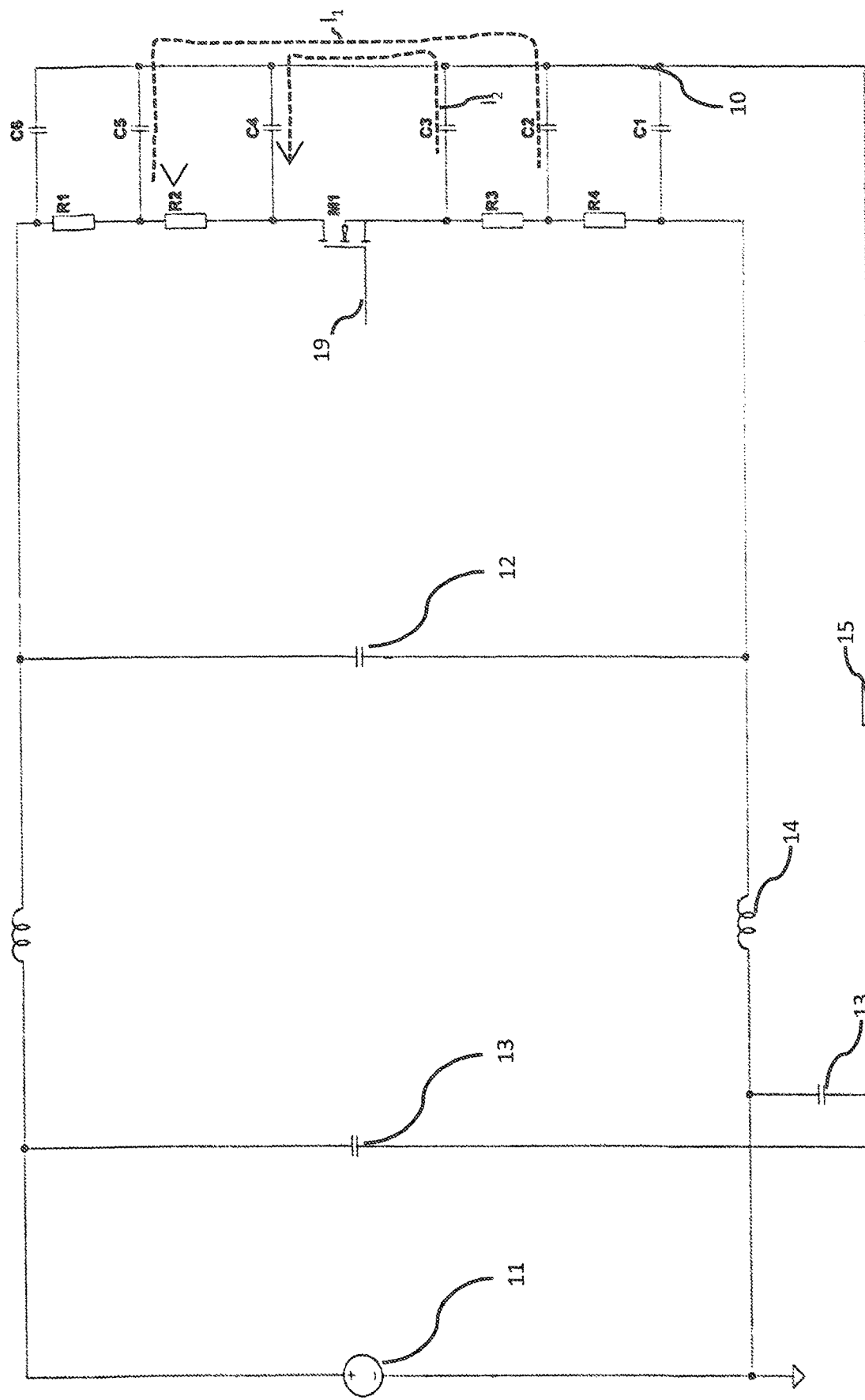

The disclosure is described below on the basis of an example in accordance with the prior art and a first exemplary embodiment, which are explained in greater detail with reference to the figures, in which:

FIG. 1 shows an arrangement for the voltage supply and switching of a resistor arranged in proximity to a housing in accordance with the prior art; and FIG. 2 shows an arrangement for the voltage supply and switching of a resistor arranged in proximity to a housing in accordance with a first exemplary embodiment of the disclosure during a first switching process.

In the following description, the same reference signs are used for identical and identically acting parts.

FIG. 1 shows a schematic view of an arrangement comprising an electrical resistor to be switched in accordance with the prior art. The electrical resistor to be switched is illustrated here symbolically by the resistors R1 to R4. In principle, however, only one (continuous) resistor is involved here. In this respect, the resistors R1 to R4 illustrated schematically can also be interpreted as resistor portions of the resistor (that is to say series-connected individual portions of the resistor). Alternatively, however, resistors (for example four) that are actually structurally delimited from one another can also be involved here. The resistor R1 to R4 is arranged close to a housing 10 for the purpose of heat dissipation (cooling).

The capacitors C1 to C5 shown in FIG. 1 correspond to a symbolic illustration of a capacitance of the resistor, said capacitance resulting from the arrangement close to the housing. In the portion-based consideration of the resistor R1 to R4 with four portions R1, R2, R3 and R4, these capacitances can then be assigned to individual portions.

Furthermore, a switch M (specifically transistor, in particular MOSFET or IGBT) is provided, which can be switched on and off. If the switch M is switched off, the resistor R1 to R4 is at the supply voltage provided by a voltage supply 11. If the switch M is then switched on (initially), the voltage across the resistor R1 to R4 changes. The lower end (in FIG. 1) of R4 tends towards 0 volts, while the upper end (in FIG. 1) of R1 is still at the supply voltage. This has the consequence that the capacitance, C1 to C5 in accordance with the schematic illustration, is wholly or partly discharged. The capacitance C1 is fully discharged, for example, while C3 is discharged to half the supply voltage. Half the supply voltage corresponds to the central voltage of the complete resistor.

On average, the complete capacitance is discharged by half the supply voltage.

If the switch M is then switched off (finally), what has just been described is repeated, in principle. The capacitances are not discharged, however, but rather charged up to the supply voltage. This charging and discharging of the capacitors C1 to C5 can lead to significant EMC interference (both conducted and emitted) depending on the switching speed.

The reference sign 12 denotes a link capacitor. Further capacitors 13 and inductances 14 are parts of a line impedance stabilisation network (LISN) and are not of importance any further for the present disclosure. An earth link of the housing 10 is symbolised by the reference sign 15.

FIG. 2 shows an arrangement analogous to FIG. 1, but with differences according to the disclosure. The elements/units bearing the reference signs 10 to 15 correspond to the arrangement in accordance with the prior art in accordance with FIG. 1, and so reference is made to the explanations concerning the prior art in this regard.

In contrast to the prior art, the arrangement in accordance with FIG. 2 comprises a switch M1, which, unlike the switch M (cf. FIG. 1), is not arranged at the end (or a terminal) of the resistor R1-R4, but rather between partial resistors R1, R2 and R3, R4 of the resistor R1 to R4. Here, too, it may be the case that the partial resistors R1, R2 and R3, R4 in turn consist of a plurality of subunits that are structurally delimited or delimitable from one another, for example a subunit R1 and a subunit R2, which jointly form the first partial resistor R1, R2, or a subunit R3 and a subunit R4, which jointly form the second partial resistor R3, R4. However, the partial resistors R1, R2 and R3, R4 can also be resistors that are not (structurally) separated from one another, such that the respective partial resistor R1, R2 and R3, R4 is not subdivided further. At all events, however, the partial resistors R1, R2 and R3, R4 are separated or separable (with regard to current conduction) by the switching device M1.

The central driving in accordance with FIG. 2 has the advantage that a distributed capacitance C1 to C6 (which results from the housing 10 and the resistor R1-R4) is compensated for and thus (ideally) no current flows via an earth link of the (equipment) housing 10. For this purpose, the switching device (transistor) M1 is fitted at the capacitive centre of the resistor.

The capacitors C1 to C6 correspond to a symbolic illustration of a capacitance that is assigned to the resistor and arises as a result of the spatially close linking of the resistor to the housing.

In the switched-off state of the switching device, a portion above the switching device M1 (or the first partial resistor R1, R2) is (completely) at the supply voltage, while the lower portion (or the second partial resistor R3, R4) (in FIG. 2) is at the earth of the voltage supply.

Upon the switching device M1 being switched on (initially), the voltage is divided uniformly across the resistors R1, R2 and R3, R4, which leads to a current flow in the (parasitic) capacitances C1 to C6.

Upon the switching device M1 being switched on, the current ($I_1$) flowing in C2, for example, is taken up (directly) by C5. The same applies to the current ($I_2$) with regard to the capacitances C3 and C4. At least in the ideal case, current then no longer flows via an earth link. The same (in the opposite direction) takes place when the switching device M1 is switched off.

The switching arrangement proposed here can furthermore avoid difficulties that may occur in the case of the parallel solution (not yet published) developed by the inventors and comprising two switching devices which are driven time-synchronously and are situated at the two ends of the resistor R1 to R4. In the case of the present solution, when dividing the resistor it is merely necessary to ensure that the capacitance magnitudes of the upper partial resistor (in FIG. 2) and of the lower partial resistor R3, R4 (in FIG. 2) are set advantageously, in particular are at least approximately equal.

Overall, in a simple manner it is possible to realise a circuit which comparatively cost-effectively and simply prevents EMC interference from arising and which makes it possible for a basic level to be reduced.

By virtue of the fact that (common-mode) interference is reduced, shorter switching times can be chosen, which reduces switching losses. No (significant) impediment of a thermal link of a component to be cooled should be expected here.

REFERENCE SIGNS

C1-C5 Capacitors (as symbolic illustration of a total capacitance)
C1-C6 Capacitors (as symbolic illustration of a total capacitance)
M Switching device
M1 Switching device
R1-R4 Resistors (as symbolic illustration of a total resistor)
10 Housing
11 Voltage supply
12 Link capacitor
13 Capacitance
14 Inductance
15 Earth link
19 Control device

The invention claimed is:

1. An electrical heating apparatus, comprising:
a heat-emitting resistor;
a control device for switching the resistor; and
an earthed housing or chassis component that is at a potential without direct reference to a drive voltage,
wherein the heat-emitting resistor is arranged in spatial proximity to the earthed housing or chassis component and comprises has a first and a second partial resistors connected in series with one another,
wherein the control device comprises at least one switching device for switching the heat-emitting resistor,
wherein the first partial resistor, the switching device and the second partial resistor are connected in series and thus form a series connection, and the switching device is arranged between the first partial resistor and the second partial resistor,
wherein the first partial resistor and the earthed housing or chassis form a first partial capacitance, and the second resistor and the earthed housing or chassis form a second partial capacitance, and wherein the first and the second partial capacitances are formed in such a way that upon the switching of the resistor a current flowing in the first partial capacitance is at least partly taken up by the second partial capacitance, or vice versa.

2. The electrical heating apparatus according to claim 1, wherein the first partial capacitance is in a range between 30% and 70% of the second partial capacitance.

3. The electrical heating apparatus according to claim 1, wherein the first partial resistor has a resistance that is in a range between 30% and 70% of a resistance of the second partial resistor.

4. The electrical heating apparatus according to claim 1, wherein the switching device comprises a transistor comprising silicon or silicon carbide or gallium arsenide.

5. The electrical heating apparatus according to claim 4, wherein the transistor is a MOSFET or IGBT.

6. The electrical heating apparatus according to claim 4, wherein the control device is configured for switching the resistor with a frequency between at least 8 kHz and at most 25 kHz.

7. The electrical heating apparatus according to claim 1, wherein the heat-emitting resistor is a heating layer resistor.

8. The electrical heating apparatus according to claim 1, further comprising a backup apparatus comprising one or more capacitors connected in parallel with the heat-emitting resistor or the switching device.

9. The electrical heating apparatus according to claim 1, wherein the control device is configured for the pulse-width-modulated driving of the heat-emitting resistor.

10. The electrical heating apparatus according to claim 1, further comprising a DC voltage source.

11. The electrical heating apparatus according to claim 1, wherein the control device is configured for switching the heat-emitting resistor with a frequency between of at least 1 kHz and/or at most 30 kHz.

12. A control method using the electrical heating apparatus according to claim 1, comprising switching the heat-emitting resistor having the first and the second partial resistors, said heat-emitting resistor being arranged in spatial proximity to the earthed housing or chassis that is at a potential without direct reference to a drive voltage, wherein the first partial resistor and the earthed housing or chassis form the first partial capacitance and the second resistor and the earthed housing or chassis form the second partial capacitance, wherein upon the switching of the heat-emitting resistor a current flowing in the first partial capacitance is at least partly taken up by the second partial capacitance, or vice versa.

13. The control method according to claim 12, wherein the heat-emitting resistor is driven in a pulse-width-modulated manner or is switched with a frequency between at least 1 kHz and at most 250 kHz.

14. Control method according to claim 12, wherein the heat-emitting resistor is driven in a pulse-width-modulated manner or is switched with a frequency between at least 8 kHz and at most 180 kHz.

15. The electrical heating apparatus according to claim 1, wherein the first partial capacitance is in a range between at least 40 and at most 60 of the second partial capacitance.

16. The electrical heating apparatus according to claim 1, wherein the first partial resistor has a resistance that is in a range between at least 30% and at most 70% of a resistance of the second partial resistor.

\* \* \* \* \*

UNITED STATES PATENT AND TRADEMARK OFFICE
CERTIFICATE OF CORRECTION

PATENT NO. : 11,758,620 B2  
APPLICATION NO. : 16/627082  
DATED : September 12, 2023  
INVENTOR(S) : Alexander Henne et al.

Page 1 of 1

It is certified that error appears in the above-identified patent and that said Letters Patent is hereby corrected as shown below:

In the Claims

Column 8, Claim 1, Line 27, "chassis component that" should be --chassis that--.

Column 8, Claim 1, Line 30, "chassis component" should be --chassis--.

Signed and Sealed this  
Fifth Day of March, 2024

Katherine Kelly Vidal  
*Director of the United States Patent and Trademark Office*